(12) United States Patent
Choi

(10) Patent No.: US 10,336,490 B2
(45) Date of Patent: Jul. 2, 2019

(54) TAPING MACHINE FOR ATTACHING INSULATION TAPE TO OUTER PERIPHERAL SEALING PART OF BATTERY CELL

(71) Applicant: LG CHEM, LTD., Seoul (KR)

(72) Inventor: Sung Ho Choi, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 15/883,658

(22) Filed: Jan. 30, 2018

(65) Prior Publication Data

US 2018/0215490 A1    Aug. 2, 2018

(30) Foreign Application Priority Data

Jan. 31, 2017    (KR) .......................... 10-2017-0013546

(51) Int. Cl.

| B65B 51/00 | (2006.01) |
|---|---|
| B65H 35/00 | (2006.01) |
| H01M 10/00 | (2006.01) |
| B65B 61/00 | (2006.01) |
| B65B 63/00 | (2006.01) |

(Continued)

(52) U.S. Cl.
CPC ............ B65B 51/067 (2013.01); B65B 61/22 (2013.01); B65B 63/00 (2013.01); B65H 35/004 (2013.01); B65H 35/006 (2013.01); B65H 35/008 (2013.01); B65H 35/0013 (2013.01);

(Continued)

(58) Field of Classification Search
CPC ............................ B65B 51/067; B65H 35/008; B65H 35/0013; B65H 35/004; B65H 35/006; B65H 37/06; H01M 10/0404; H01M 10/0525; H01M 10/0413; H01M 10/0436; H01M 2/0212; H01M 2/0267; H01M 2/34

See application file for complete search history.

(56) References Cited

U.S. PATENT DOCUMENTS

2011/0252632 A1* 10/2011 Stancu ............... B65H 35/0013
                                                                29/623.2

FOREIGN PATENT DOCUMENTS

| EP | 2447331 A1 * | 5/2012 | ............ C09J 123/22 |
|---|---|---|---|
| KR | 20120080003 A * | 7/2012 | ......... B65H 35/0013 |

(Continued)

OTHER PUBLICATIONS

CSP Search Report at KIPO; KR Application No. KR 10-2017-0013546; 2 pages; dated Nov. 16, 2018. (Year: 2018).*

Primary Examiner — Linda L Gray
(74) Attorney, Agent, or Firm — Morgan, Lewis & Bockius LLP (57) ABSTRACT

A taping machine includes: a conveyor to convey the battery cell to a taping part and a finish processing part in this order; a tape supply part configured such that the insulation tape is wound therearound and is moved while being unwound in a direction corresponding to a moving direction of the conveyor; a taping part for attaching the insulation tape to the battery cell, the taping part being configured to cut the insulation tape positioned thereon into a length of 80% to 100% of the length of a to-be-insulated portion and temporality attach the cut insulation tape to the to-be-insulated portion; and a finish processing part for attaching the tape to the battery cell, the finish processing portion pressing the insulation tape in a state in which the battery is received from the taping part so that the insulation tape is attached to the entire to-be-insulated portion.

21 Claims, 3 Drawing Sheets

(51) Int. Cl.
*H01M 2/00* (2006.01)
*B65B 51/06* (2006.01)
*H01M 10/04* (2006.01)
*B65B 61/22* (2006.01)
*H01M 10/0525* (2010.01)
*H01M 2/02* (2006.01)

(52) U.S. Cl.
CPC ...... *H01M 10/0404* (2013.01); *H01M 2/0267* (2013.01); *H01M 10/0525* (2013.01)

(56) References Cited

FOREIGN PATENT DOCUMENTS

| | | | | |
|---|---|---|---|---|
| KR | 20130065286 A | * | 6/2013 | ............ H01M 2/021 |
| KR | 20130094974 A | * | 8/2013 | .......... H01M 2/0267 |
| KR | 20160145507 A | * | 12/2016 | ............. H01M 2/10 |
| WO | WO-2013122367 A1 | * | 8/2013 | .......... H01M 2/0267 |

* cited by examiner

TAPING MACHINE FOR ATTACHING INSULATION TAPE TO OUTER PERIPHERAL SEALING PART OF BATTERY CELL

CROSS-REFERENCE TO RELATED APPLICATION

This application claims priority to Korean Patent Application No. 10-2017-0013546 filed on Jan. 31, 2017 and all the benefits accruing therefrom under 35 U.S.C. § 119, the contents of which are incorporated by reference in their entirety.

BACKGROUND

The present disclosure relates to a taping machine for attaching an insulation tape to an outer peripheral sealing part of a battery cell.

Among secondary batteries that have been recently increasingly used, square secondary batteries and pouch-type secondary batteries that have a small thickness and can be used for products such as mobile phones are highly demanded in terms of shapes of batteries, and lithium secondary batteries such as lithium ion batteries and lithium ion polymer batteries that have merits of high energy density, high discharge voltage, output stability, and the like are highly demanded in terms of materials.

In addition, secondary batteries are also classified according to the configuration of an electrode assembly with a positive electrode/separator/negative electrode structure. Representative electrode assemblies may include: a jelly-roll (wound type) electrode assembly having a structure in which elongated sheet-type positive and negative electrodes are wound while a separator is interposed; a stack-type (stacked) electrode assembly in which a plurality of positive and negative electrodes cut into units each having a predetermined size are sequentially stacked while a separator is interposed; and a stack folding-type electrode assembly having a structure in which bi-cells or full-cells, in each of which predetermined units of positive and negative electrodes are stacked while a separator is interposed, are wound by means of a separation film.

Recently, the pouch-type battery cell, having a structure in which a stack-type or stack/folding-type electrode assemblies are embedded into a pouch-type battery case made of an aluminum laminate sheet, has drawn attention due to low manufacturing costs, a small weight, an easily changeable shape, and the like, and the use thereof is gradually increasing.

Figure 1:
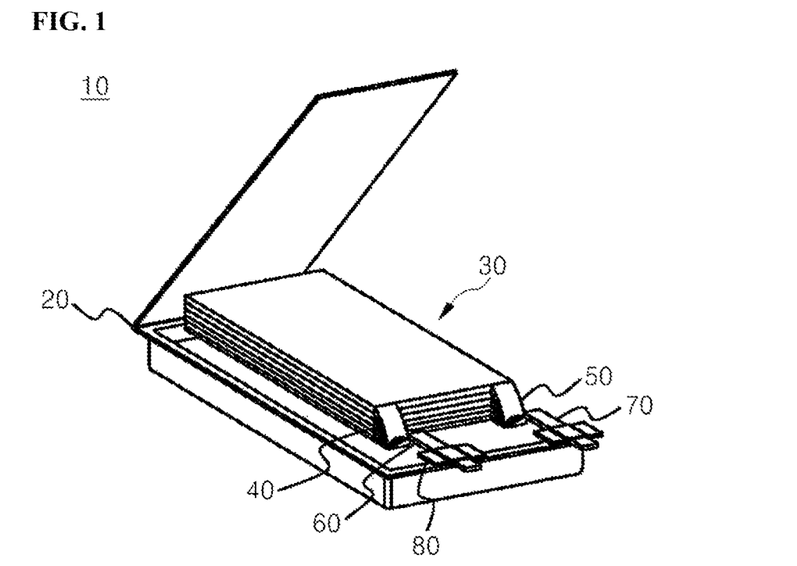
FIG. 1 is a schematic view of a battery cell for describing an existing art.

FIG. 1 is an exploded perspective view schematically illustrating a general structure of an existing typical pouch-type battery cell.

Referring to FIG. 1, a pouch-type battery cell 10 includes: an electrode assembly 30; electrode taps 40 and 50 extending from the electrode assembly 30; electrode leads 60 and 70 welded to the electrode taps 40 and 50; and a battery case 20 accommodating the electrode assembly 30.

The electrode assembly 30 is a power generating element in which positive and negative electrodes are sequentially stacked while a separator is interposed, and has a stack-type or a stack/folding-type structure. The electrode taps 40 and 50 extend from each of electrode plates of the electrode assembly 30, and the electrode leads 60 and 70 are electrically connected by, for example, welding, to the respective electrode taps 40 and 50 extending from each of the electrode plates of the electrode assembly 30 and have portions exposed outside the battery case 20. In addition, insulating films 80 are attached to a portion of the top and bottom surfaces of the electrode leads 60 and 70 to improve sealing property and ensure electrical insulation state with respect to the battery case 20.

The battery case 20 is formed of an aluminum laminate sheet which is a soft packaging material, provides a space for accommodating the electrode assembly 30, and has a pouch shape as a whole. In the case of the stack-type electrode assembly 30 as illustrated in FIG. 1, an inner upper end of the battery case 20 is spaced apart from the electrode assembly 30 so that a plurality of positive electrode taps 40 and a plurality of negative electrode taps 50 are coupled to the electrode leads 60 and 70 together.

Such a pouch-type battery cell has a limitation in that in a step of accommodating the electrode assembly into the laminate sheet, injecting electrolyte, and sealing through thermal fusion or the like, an inner resin layer of a thermal fusion region (outer peripheral part) protrudes to the outside due to contamination during the injection of electrolyte, excessive fusion phenomenon in the innermost resin layer of the laminate sheet, and/or pressurization, so that a perfect sealing state cannot be maintained even after performing the thermal fusion, moisture easily penetrates into the battery cell, and the electrolyte may leak.

In addition, in the pouch-type battery cell, an insulation breakdown phenomenon may be caused because a metal layer is exposed at an end portion of the laminate sheet which is the battery case, and there is possibility that moisture or the like may penetrate through the thermal fusion portion at the end portion.

Regarding this, there is a well-known technique for improving sealing property together with insulation by attaching an insulation tape to the outer peripheral part of the battery cell.

Conventionally, a battery cell having such a structure was manufactured such that a worker manually removes a release paper of a tape and then attaches the tape in a predetermined shape to the outer periphery of the thermal fusion part of the battery cell.

However, such a method has drawbacks in that a plurality of workers are required, a long process time is consumed due to the manual work, and thus, the manufacturability of the method is low.

This causes a rise in the unit price of the battery cell, and as described above, this is a reason for making mass-production of a high-quality battery cell having improved insulating and sealing properties difficult.

Thus, a technique that can radically solve the above-described limitations is highly demanded.

SUMMARY

The present disclosure provides a solution for limitations of typical arts and technical subjects demanded from the past.

Specifically, the present disclosure provides a taping machine including a conveyor, a taping part, and a finish processing part to automate a step of attaching an insulation tape.

In accordance with an exemplary embodiment, a taping machine for attaching an insulation tape only to a to-be-insulated portion along an outer peripheral portion of a battery cell includes: a conveyor configured to convey the battery cell to a taping part and a finish processing part in this order; a tape supply part configured such that the insulation tape is wound therearound and is moved while being unwound in a direction corresponding to a moving direction of the conveyor; a taping part for attaching the insulation tape to the battery cell, the taping part being configured to cut the insulation tape positioned thereon into a length of 80% to 100% of the length of the to-be-insulated portion in a state that the battery cell is received from the conveyor and temporality attach the cut insulation tape to the to-be-insulated portion; and a finish processing part for attaching the tape to the battery cell, the finish processing part pressing the insulation tape in a state, in which the battery is received from the taping part, so that the insulation tape is attached to the entire to-be-insulated portion.

The taping machine may further include: a battery cell supply part for supplying the battery cell to the conveyor; and an aligning guide configured to align the battery cell supplied to the conveyor before the battery cell is supplied to the taping part and the finish processing part.

That is when the taping machine in accordance with an exemplary embodiment is used, the battery cell is sequentially conveyed through the conveyor to the taping part and the finish processing part, the insulation tape unwound from the tape supply part can be automatically attached to the battery cell by means of the taping part and the finish processing part, and therefore the attaching step of the insulation tape may be automated unlike typical arts, and accordingly, costs for man power, time, and like are saved and the manufacturability of the battery cell may be improved.

In the present invention, the tape supply part may have the insulation tape which is wound around a roller and includes one surface on which an adhesive is applied and the other surface on which the adhesive is not applied.

That is, in the present invention, a tape without a release paper rather than a tape with a general tape structure in which a release paper is attached may be used, and accordingly, man power for removing the release paper or an automatic apparatus is omitted and a process may further be simplified.

In the present invention, the to-be-insulated portion may be set from first and second outer peripheral sealing parts, which foil a side surface of the battery cell and are respectively close to both end portions of a third outer peripheral sealing part, in which electrode terminals are formed, to portions of an upper surface of the battery cell respectively close to the outer peripheral sealing parts.

Among the to-be-insulated portions, the taping part may be configured to temporarily attach portions of the tape only to the first and second outer peripheral sealing parts, and the finish processing part may be configured such that portions of the tape temporarily attached to the first and second outer peripheral sealing parts are further pressed, and remaining unattached portions of the tape are attached to the upper surface of the battery cell while being bent toward the upper surface of the battery cell.

Accordingly, in the to-be-insulated portion, the tape may be attached to only a portion the to-be-insulated portion in the taping part, and other portions the to-be-insulated portion may be taped in the finish processing part. In the above-mentioned configuration, the insulation tape are attached to a region from the first and second outer peripheral sealing parts, which are the side surface of the battery cell, to the upper surface of the battery cell because a very precise process structure is required to automate the process.

Accordingly, specific structures of the taping part and the finish processing part will be described in detail through the following non-limiting example.

In one specific example, the taping part may be configured to include: a hold bar configured to move forward/backward with respect to the progressing direction of the insulation tape and support one surface of the insulation tape; a stripper configured to move perpendicular to a moving direction of the hold bar while being in close contact with the other surface of the insulation tape supported by the hold bar; a cutter configured to cut the insulation tape fixed between the hold bar and the stripper while moving to face the stripper; and a stopper configured to support a portion of the insulation tape cut by the cutter, wherein when the cutter cuts the insulation tape, the cut insulation tape may be attached to the outer peripheral sealing part while the stripper vertically moves so as to engage with the cutter.

The hold bar has a first operation state in which the hold bar moves in a direction toward the tape supply part, and then, while the insulation tape is attached thereto, moves to position the insulation tape on the stripper; and a second operation state in which when the cutter cuts the insulation tape, the hold bar is separated from the cut insulation tape, and then moves in a direction toward the tape supply part to be attached to the uncut insulation tape, wherein the first operation state and the second operation state may be repeated.

That is, the hold bar functions to move the insulation tape to the taping part and support the insulation tape so that the insulation tape is easily cut when the insulation tape is positioned at the taping part. In addition, due to such an operation states of the hold bar, it is not necessary to use a general tape on which a release paper is attached in an exemplary embodiment.

In one specific example, the finish processing part may be a cam member which is movable forward backward with respect to the side surface of the battery cell.

Specifically, the cam member may include: a first cam configured to move so as to be brought into close contact with the insulation tape attached on the side surface of the battery cell; a second cam vertically extending from the first cam and configured to attach, to the upper surface, the insulation tape while vertically bending the insulation tape, which protrudes over the side surface of the battery cell when the first cam approaches the side surface of the battery cell; and an inclined part extending in an inclined shape from an end portion of the second cam.

The second cam and the inclination part may be integrally formed with each other, and the first cam and the second cam may be independent members mechanically fastened to each other.

Accordingly, the first cam and the second cam may move forward/backward with respect to the side surface of the battery cell independently of each other. For example, while the first cam is moved backward, only the second cam may attach the insulation tape, and conversely, while the second cam is not moved, only the first cam may attach the insulation tape while approaching the battery cell. Of course, this is an exemplary description, and the first cam and the second cam may move together in the direction toward the side surface of the battery cell.

An attached state of the insulation tape on the cam member may be configured such that when the second cam bends the insulation tape, the insulation tape is guided along the inclined surface of the inclined part and firstly bent into a first angle which is the inclination angle of the inclined part, and in this state, the insulation tape is then gradually bent into a second angle which forms an angle of zero degree with the upper surface of the battery cell.

If the insulation tape is attached to the upper surface of the battery cell while being vertically bent at once, the outermost end portion of the insulation tape may firstly be attached to the upper surface of the battery cell, and accordingly, while a tape portion corresponding to a bent position of the battery cell and a portion of the tape from the tape portion to the outermost end portion are not attached, unexpected wrinkle or swell may be caused by an unattached portion.

Conversely, in the cam member of an exemplary embodiment, the insulation tape may be attached to the battery cell while being gradually bent into two angles due to the inclined part, and therefore the tape portion corresponding to the bent position may firstly be bent contrary to the above-mentioned case, and then, each of portions of the tape up to the outermost side of the tape is attached onto the battery cell, and thus, formation of wrinkle, swell, or the like on the attached insulation tape may be prevented.

Meanwhile, in the taping machine in accordance with an exemplary embodiment, the taping part and the finish processing part may respectively be formed in structures in which the insulation tape is attached in different side surfaces, that is, in respective directions toward the first outer peripheral sealing part and the second outer peripheral sealing part, and accordingly, the taping part and the finish processing part may respectively be configured from two units of independent members.

Specifically, the taping part may include: a first taping part for temporarily attaching the insulation tape to the first outer peripheral sealing part of the battery cell; a second taping part for temporarily attaching the insulation tape to the second outer peripheral sealing part; the finish processing part may include a first finish processing part for finishing an insulation tape attachment on the first outer peripheral sealing part; and a second finish processing part for finishing an insulation tape attachment on the second outer peripheral sealing part; and the conveyor may convey the battery cell again to the second taping part and the second finish processing part in this order in the state in which the battery cell has been conveyed to the first taping part and the first finish processing part in this order.

In accordance with another exemplary embodiment, an apparatus for manufacturing a battery cell including the taping machine as a portion of the process equipment is provided.

The apparatus for manufacturing a battery cell may include, in addition to the taping machine, at least one selected from: an electrode manufacturing part configured to apply a binder containing electrode materials onto an electrode assembly and dry and roll the resultant to manufacture electrodes; an electrode assembly manufacturing device configured to combine the manufactured electrodes to manufacture an electrode assembly; a punching device configured to form on a laminate sheet a recessed accommodation part for accommodating the electrode assembly; an electrolyte injection device configured to accommodate the electrode assembly and inject an electrolyte; a thermal fusion sealing device configured to perform thermal fusion and sealing of an outer periphery of the battery case in which the electrode assembly and the electrolyte are accommodated; a gas processing device configured to discharge inner gas to the outside from the thermally fused battery case; and an activation device configured to mature the battery cell at a predetermined temperature.

BRIEF DESCRIPTION OF THE DRAWINGS

Exemplary embodiments can be understood in more detail from the following description taken in conjunction with the accompanying drawings, in which.

DETAILED DESCRIPTION OF EMBODIMENTS

Hereinafter, embodiments of the present disclosure will be described in detail with reference to the accompanying drawings so that the present disclosure may easily be carried out by a person with ordinary skill in the art to which the invention pertains. The present disclosure may, however, be embodied in different forms and should not be construed as limited to the embodiments set forth herein. In the drawings, anything unnecessary for describing the present disclosure will be omitted for clarity, and like reference numerals in the drawings denote like elements.

Although the terms such as "first" and "second" are used herein to describe various elements, these elements should not be limited by these terms. The terms are only used to distinguish one component from other components. For example, without departing from the scope of the present invention, a first component may be referred to as a second component, and similarly, the second component may also be referred to as the first component. In the following description, the technical terms are used only for explaining a specific exemplary embodiment while not limiting the present disclosure. The terms of a singular form may include plural forms unless referred to the contrary.

In this disclosure below, when one part is referred to as being 'connected' to another part, it should be understood that the former can be 'directly connected' to the latter, or 'electrically connected to the latter via an intervening part. Furthermore, when it is described that one part "includes" some components, it does not mean that other components are excluded but means that other elements may be further included if there is no specific contrary indication. The terms "step of (performing)" or "step of (doing)" used in the entire specification of the present disclosure does not mean "step for".

Terms used in the present invention is selected as general terms as widely used as possible while considering functions in the present invention, but these may be changed according to an intent of a person skilled in the art, a precedent, an advent of new technique, or the like. In addition, in a specific case, there are terms arbitrarily selected by applicants, and in this case, the meaning of the terms will be described in detail in the corresponding description part of the present invention. Accordingly, the terms used in the present invention should be defined on the basis of the meanings the terms have and the contents of the entirety of the present invention rather than defined by simple names of the terms.

Hereinafter the present invention will be described in detail with reference to the accompanying drawings.

Figure 2:
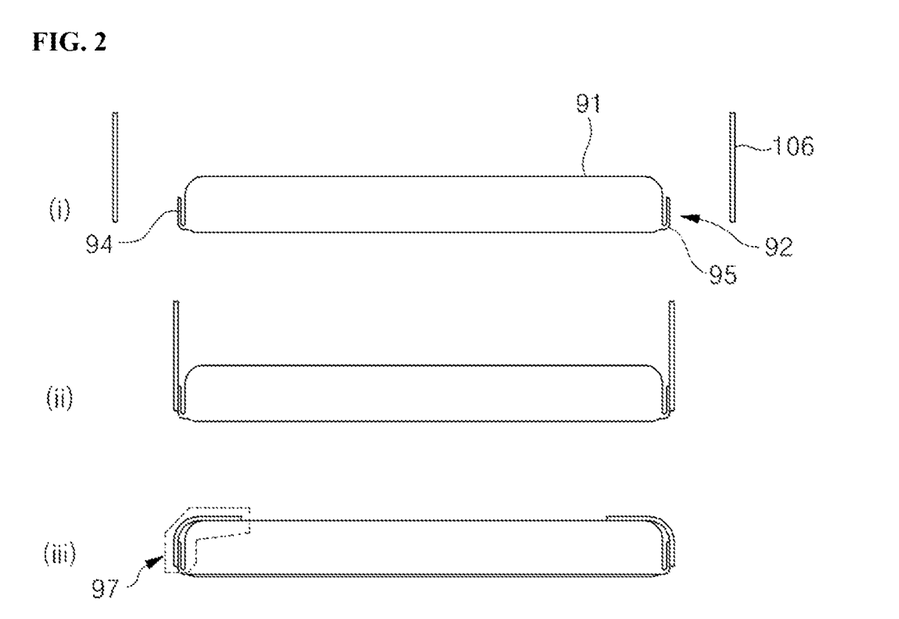
FIG. 2 illustrates schematic views of a battery cell for describing a technique in accordance with an exemplary embodiment.
Figure 3:
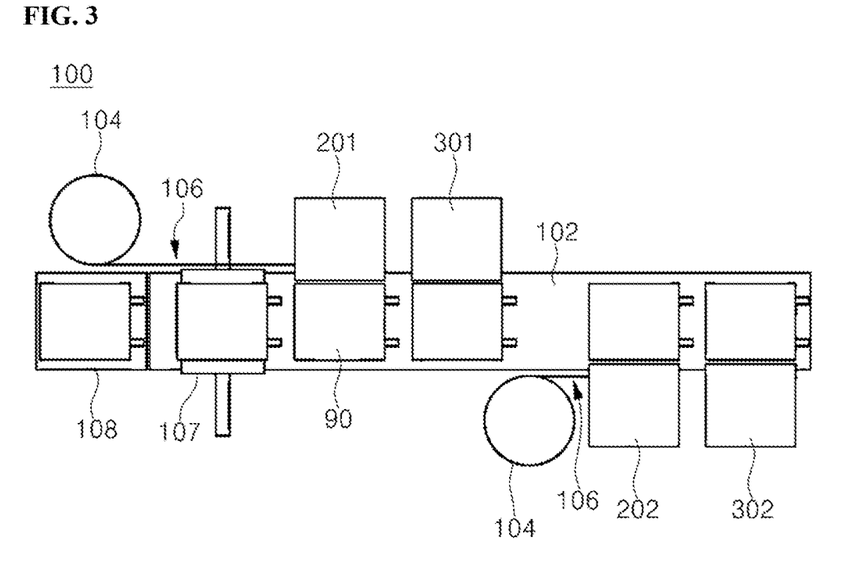
FIG. 3 is a schematic view of a taping machine in accordance with an exemplary embodiment.

Referring to FIGS. 2 and 3 for describing one exemplary embodiment, a taping machine 100 includes a conveyor 102 for conveying a battery cell 90; a battery cell supply part 108 for supplying the battery cell 90 to the conveyor 102; an aligning guide 107 for aligning the battery cell 90 supplied to the conveyor 102; a tape supply part 104 from which an insulation tape 106 is unwound out; a taping part 200; and a finish processing part 300.

The aligning guide 107 includes a pair of guides brought into close contact with the side surface 92 of the battery cell 90, and the guides align the battery cell 90 to a desired position on the conveyor 102 and fix bent shapes of outer peripheral sealing parts 94 and 95 of the battery cell 90. When the bending of the outer peripheral sealing parts 94 and 95 is released, since the entire taping process to be described later may be badly affected, the aligning guide 107 is positioned at a position to which the battery cell 90 is supplied.

The insulation tape 106 is wound around the tape supply part 104, and the insulation tape 106 is configured to move while being unwound out in a direction corresponding to the moving direction of the conveyor 102.

The taping part 200 includes a first taping part 201 which temporarily attaches the insulation tape 106 to a first outer peripheral sealing part 94 of the battery cell 90; and a second taping part 202 which temporarily attaches the insulation tape 106 to a second outer peripheral sealing part 95.

The finish processing part 300 includes a first finish processing part 301 which finishes the attachment of the insulation tape 106 to the first outer peripheral sealing part 94; and a second finish processing part 301 which finishes the attachment of the insulation tape 106 to the second outer peripheral sealing part 95.

The conveyor 102 is configured to convey the battery cell 90 to a second taping part 202 and the second finish processing part 320 in this order in the state in which the battery cell 90 has been conveyed to the first taping part 201 and the first finish processing part 301 in this order.

When the battery cell 90 is received from the conveyor 102, each of the first taping part 201 and the second taping part 202 cut the insulation tape 106 positioned on the taping part 200 into a length of approximately 85% of the length of a to-be-insulated portion 97 of the battery cell 90, and temporarily attaches the cut tape 106 to a portion of the to-be-insulated portions 97.

Specifically, at this point, the to-be-insulated portions 97 are close to both end portions of a third outer peripheral sealing part (not shown) on which electrode terminals are formed, and are side portions of the battery cell 90 which are set from the first and second outer peripheral sealing parts 94 and 95 to respective portions of the upper surface of the battery cell 90, the portions being respectively close to the outer peripheral sealing parts 94 and 95.

The insulation tape 106 is attached to the battery cell 90 in a form in which the first and second peripheral sealing parts 94 and 95 which have been bent are fixed to the battery cell 90.

In an exemplary embodiment, the taping part 200 is configured to temporarily attach only a portion of the insulation tape 106 to only the first and second peripheral sealing parts 94 and 95, and structures for this are the same in the first taping part 201 and the second taping part 202. Accordingly, hereinafter the first taping part 201 and the second taping part 202 which have the same structure are referred to as the taping part 200, and the structure thereof will be described with reference to FIGS. 4 and 5.

Figure 4:
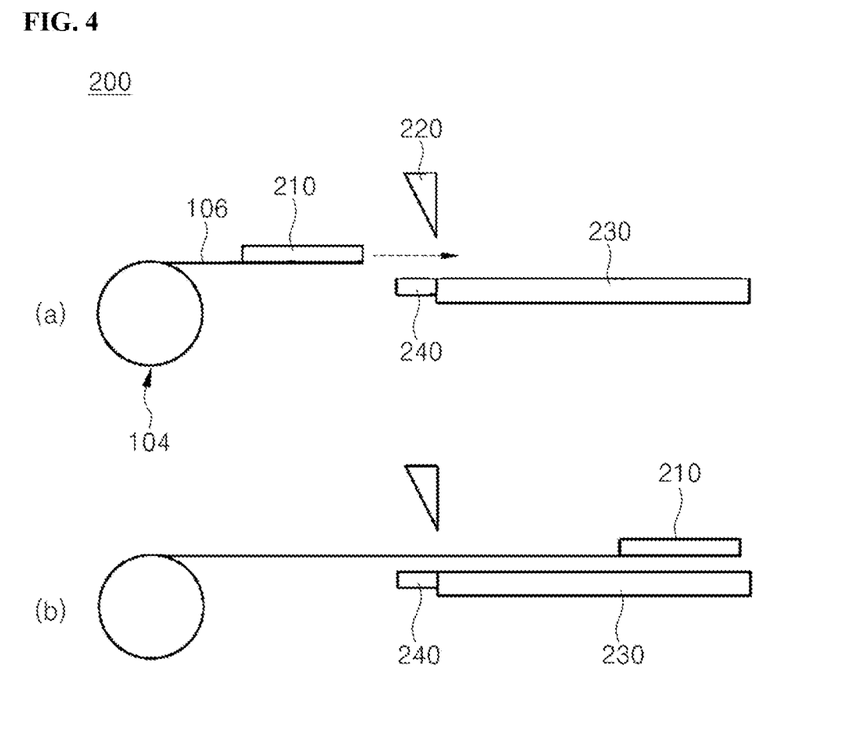
FIGS. 4 and 5 are schematic views illustrating operation states of a taping part.
Figure 5:
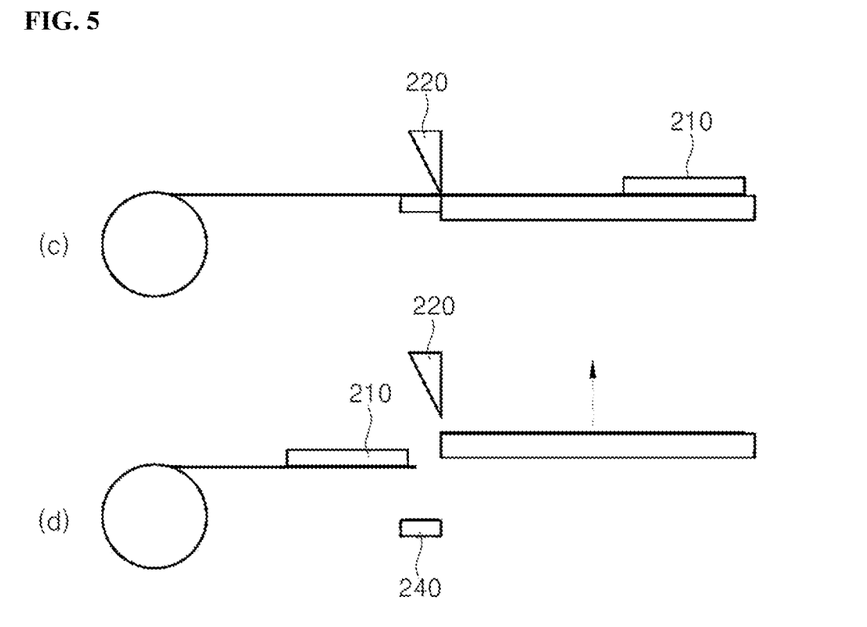

The taping part 200 is configured to move forward/backward with respect to the progressing direction of the insulation tape 106, and includes a hold bar 210 which supports one surface of the insulation tape 106; a stripper 230 which moves perpendicular to the moving direction of the hold bar 210 while being in close contact with the other surface of the insulation tape 106 supported by the hold bar 210; a cutter 220 which cuts the insulation tape 106 fixed between the hold bar 210 and the stripper 230 into a predetermined size while moving to face the stripper 230; and a stopper 240 configured to support a portion of the insulation tape 106 cut by the cutter 220.

First, as illustrated in operation states (a) and (b) of FIG. 4, the hold bar 210 moves in a direction toward the tape supply part 104 and then positions the insulation tape 106 above the stripper 230 while the insulation tape 106 is attached to the hold bar 210.

Subsequently, in an operation state (c) of FIG. 5, the stripper 230 and the stopper 240 vertically moves in the direction toward the other surface of the insulation tape 106 supported by the hold bar 210, the insulation tape 106 is fixed between the hold bar 210 and the stripper 230, and while the cutter 220 vertically moves in the direction toward the stopper 240, the insulation tape 106 is cut. At this point, the stripper 230 vertically moves to engage with the cutter 220.

In operation state (d) of FIG. 5, the cutter 220 moves upward, the stopper 240 moves reverse to the cutter 220, and the hold bar 210 is separated from the cut insulation tape 106, moves then in the direction toward the tape supply part 104, and then is adhered to the uncut insulation tape 106. In addition, the stripper 230 attaches the cut insulation tape 106 to the outer peripheral sealing parts 94 and 95 of the battery cell 90 while continuously vertically moving.

At this point, the stripper 230, as illustrated in shape (ii) of FIG. 2, portions of the insulation tape 106 are temporarily attached only to the outer peripheral sealing parts 94 and 95, and the insulation tape 106 protrudes over the upper surface of the battery cell 90 while being attached to the outer peripheral sealing parts 94 and 95.

The insulation tape 106 temporarily attached as such may be completely attached to the battery cell 90 by means of a cam member of the finish processing part 300 when the battery cell 90 moves to the finish processing part 300.

Figure 6:
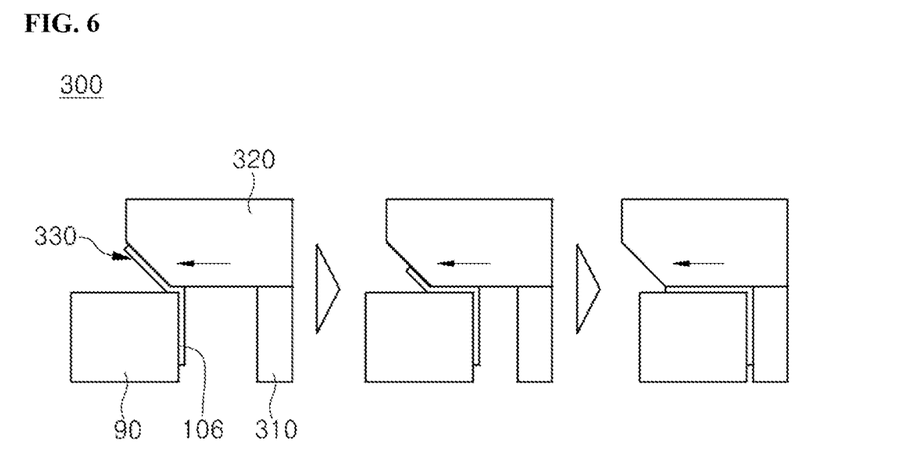
FIG. 6 illustrates schematic views illustrating operation states of a finish processing part.

Hereinafter the first finish processing part 301 and the second finish processing part 302 which have the same structure are referred to as the finish processing part 300, and the structures thereof will be described with reference to FIG. 6.

Specifically, the finish processing part 300 is configured to have a structure in which portions of the insulation tape 106 temporarily attached on the outer peripheral sealing parts 94 and 95 are further pressed, and the remaining unattached portions of the insulation tape 106 are attached to the upper surface of the battery cell 90 while being bent in the direction toward the upper surface of the battery cell 90.

To this end, the finish processing part 300 is configured from a cam member which can move forward/backward with respect to the side surface of the battery cell 90, and the cam member includes: a first cam 310 which moves so as to be brought into close contact with the insulation tape 106 attached to the side surface 92 of the battery cell 90; a second cam 320 which vertically extends from the first cam 310 and attaches the insulation tape 106 protruding over the side surface 92 of the battery cell 90 while bending the tape 106 in a right angle when the first cam 310 approaches the side surface 92 of the battery cell 90; and an inclined part 330 which extends in an inclined shape from an end portion of the second cam 320.

The second cam 320 and the inclined part 300 are integrally formed with each other, and the first cam 310 and the second cam 320 are independent members mechanically fastened to each other.

The shape of the insulation tape 106 attached by the cam member is formed such that the first cam 310 and the second cam 320 approach the side surface 92 of the battery cell 90 together, and at this point, the insulation tape 106 protruding over the side surfaces of the battery cell 90 is attached to the upper surface of the battery cell 90 while being bent corresponding to the second cam 320.

When being bent as such, the insulation tape 106 is firstly bent into a first angle which is the angle of the inclined part 330 while being guided along the inclined surface of the inclined part 330, and in this state, the insulation tape 106 is gradually bent into a second angle which forms an angle of zero degree with the upper surface of the battery cell 90.

Subsequently, while the first cam 310 is brought into close contact with the side surface 92 of the battery cell 90, the insulation tape 106 is pressed in the direction toward the side surface 92 of the battery cell 90, and thus a firm attachment is achieved.

When a taping machine in accordance with exemplary embodiments is used, a step of attaching an insulation tape in a manufacturing process of a battery cell can be automated, and thus, the manufacturability of the battery cell having improved insulating and sealing properties may be improved without inputting man power.

So far, the technical idea of the present invention has been specifically described with respect to the above embodiments, but it should be noted that the foregoing embodiments are provided only for illustration while not limiting the present invention. Various embodiments may be provided to allow those skilled in the art to understand the scope of the preset invention, but the present invention is not limited thereto.

What is claimed is:

1. A taping machine for attaching an insulation tape only to a to-be-insulated portion set along an outer peripheral portion of a battery cell, comprising:
   a taping part configured to apply a portion of the insulation tape to a side surface of the battery cell included in the to-be-insulated portion;
   a finish processing part configured to finish an attachment of the insulation tape to the battery cell;
   a conveyor configured to convey the battery cell to the taping part and the finish processing part in order; and
   a tape supply part configured such that the insulation tape is wound therearound and is moved while being unwound in a direction corresponding to a moving direction of the conveyor;
   wherein the taping part is configured to cut the insulation tape, and is configured to apply the cut insulation tape to the side surface of the battery included in the to-be-insulated portion; and
   wherein the finish processing part is configured to press the portion of the insulation tape applied to the side surface of the battery cell and to press remaining unattached portions of the insulation tape onto an upper surface of the battery cell included in the to-be insulated portion so that the insulation tape is attached to an entire to-be-insulated portion.

2. The taping machine of claim 1, wherein:
   the to-be-insulated portion is defined to extend from first and second outer peripheral sealing parts, which form side surfaces of the battery cell and are respectively close to both end portions of a third outer peripheral sealing part, in which electrode terminals are formed, to portions of the upper surface of the battery cell respectively close to the outer peripheral sealing parts;
   the taping part is configured to apply a portion of the insulation tape only to the first and second outer peripheral sealing parts; and
   the finish processing part is configured such that portions of the insulation tape applied to the first and second outer peripheral sealing parts are further pressed and remaining unattached portions of the insulation tape are attached to the upper surface of the battery cell by being bent onto the upper surface of the battery cell.

3. The taping machine of claim 2, wherein the taping part comprises:
   a first taping part configured to apply the insulation tape to the first outer peripheral sealing part of the battery cell; and
   a second taping part configured to apply the insulation tape to the second outer peripheral sealing part, the finish processing part comprises:
      a first finish processing part configured to finish an insulation tape attachment on the first outer peripheral sealing part; and
      a second finish processing part configured to finish an insulation tape attachment on the second outer peripheral sealing part,
   wherein the conveyor conveys the battery cell to the second taping part and the second finish processing part in this order in the state in which the battery cell has been conveyed to the first taping part and the first finish processing part in this order.

4. The taping machine of claim 2, wherein the taping part is configured to comprise:
   a hold bar configured to move forward/backward with respect to the progressing direction of the insulation tape and support one surface of the insulation tape;
   a stripper configured to move perpendicular to a moving direction of the hold bar while being in close contact with the one surface of the insulation tape supported by the hold bar;
   a cutter configured to cut the insulation tape fixed between the hold bar and the stripper while moving to face the stripper; and
   a stopper configured to support a portion of the insulation tape cut by the cutter,
   wherein when the cutter cuts the insulation tape, the cut insulation tape is attached to the outer peripheral sealing part while the stripper vertically moves so as to engage with the cutter.

5. The taping machine of claim 4, wherein the hold bar has:
   a first operation state in which the hold bar moves in a direction toward the tape supply part, and then, while the insulation tape is attached thereto, moves to position the insulation tape on the stripper; and
   a second operation state in which when the cutter cuts the insulation tape, the hold bar is separated from the cut insulation tape, and then moves in a direction toward the tape supply part to be attached to the uncut insulation tape,
   wherein the first operation state and the second operation state are repeated.

6. The taping machine of claim 2, wherein the finish processing part includes a cam member that is movable forward/backward with respect to the side surface of the battery cell.

7. The taping machine of claim 6, wherein the cam member comprises:

a first cam configured to move so as to be brought into close contact with the insulation tape attached on the side surface of the battery cell;
a second cam vertically extending from the first cam and configured to attach, to the upper surface, the insulation tape while vertically bending the insulation tape, which protrudes over the side surface of the battery cell, when the first cam approaches the side surface of the battery cell; and
an inclined part extending in an inclined shape from an end portion of the second cam.

8. The taping machine of claim 7, wherein:
when the second cam bends the insulation tape, the insulation tape is guided along the inclined surface of the inclined part and firstly bent into a first angle which is the inclination angle of the inclined part, and
thereafter, the insulation tape is then gradually bent into a second angle which forms an angle of zero degree with the upper surface of the cell.

9. The taping machine of claim 7, wherein the second cam and the inclination part are integrally formed with each other, and the first cam and the second cam are independent members mechanically fastened to each other.

10. The taping machine of claim 7, wherein the first cam and the second cam are configured to move forward/backward with respect to the side surface of the battery cell independently of each other.

11. The taping machine of claim 1, further comprising
a battery cell supply part configured to supply the battery cell to the conveyor; and
an aligning guide configured to align the battery cell supplied to the conveyor before the battery cell is supplied to the taping part and the finish processing part.

12. The taping machine of claim 1, wherein the tape supply part has the insulation tape that is wound around a roller and comprises one surface on which an adhesive is applied and another surface on which the adhesive is not applied.

13. A battery cell manufacturing apparatus comprising a taping machine in accordance with claim 1.

14. The battery cell manufacturing apparatus of claim 13, wherein:
the to-be-insulated portion is defined to extend from first and second outer peripheral sealing parts, which form side surfaces of the battery cell and are respectively close to both end portions of a third outer peripheral sealing part, in which electrode terminals are formed, to portions of the upper surface of the battery cell respectively close to the outer peripheral sealing parts;
the taping part is configured to apply a portion of the insulation tape only to the first and second outer peripheral sealing parts; and
the finish processing part is configured such that portions of the insulation tape applied to the first and second outer peripheral sealing parts are further pressed and remaining unattached portions of the insulation tape are attached to the upper surface of the battery cell by being bent onto the upper surface of the battery cell.

15. The battery cell manufacturing apparatus of claim 14, wherein the taping part comprises:
a first taping part configured to attach the insulation tape to the first outer peripheral sealing part of the battery cell; and
a second taping part configured to attach the insulation tape to the second outer peripheral sealing part, the finish processing part comprises:

a first finish processing part configured to apply an insulation tape attachment on the first outer peripheral sealing part; and
a second finish processing part configured to finish an insulation tape attachment on the second outer peripheral sealing part,
wherein the conveyor conveys the battery cell to the second taping part and the second finish processing part in this order in the state in which the battery cell has been conveyed to the first taping part and the first finish processing part in this order.

16. The battery cell manufacturing apparatus of claim 14, wherein the taping part is configured to comprise:
a hold bar configured to move forward/backward with respect to the progressing direction of the insulation tape and support one surface of the insulation tape;
a stripper configured to move perpendicular to a moving direction of the hold bar while being in close contact with the one surface of the insulation tape supported by the hold bar;
a cutter configured to cut the insulation tape fixed between the hold bar and the stripper while moving to face the stripper; and
a stopper configured to support a portion of the insulation tape cut by the cutter,
wherein when the cutter cuts the insulation tape, the cut insulation tape is attached to the outer peripheral sealing part while the stripper vertically moves so as to engage with the cutter.

17. The battery cell manufacturing apparatus of claim 16, wherein the hold bar has:
a first operation state in which the hold bar moves in a direction toward the tape supply part, and then, while the insulation tape is attached thereto, moves to position the insulation tape on the stripper; and
a second operation state in which when the cutter cuts the insulation tape, the hold bar is separated from the cut insulation tape, and then moves in a direction toward the tape supply part to be attached to the uncut insulation tape,
wherein the first operation state and the second operation state are repeated.

18. The battery cell manufacturing apparatus of claim 14, wherein the finish processing part includes a cam member that is movable forward/backward with respect to the side surface of the battery cell.

19. The battery cell manufacturing apparatus of claim 18, wherein the cam member comprises:
a first cam configured to move so as to be brought into close contact with the insulation tape attached on the side surface of the battery cell;
a second cam vertically extending from the first cam and configured to attach, to the upper surface, the insulation tape while vertically bending the insulation tape, which protrudes over the side surface of the battery cell, when the first cam approaches the side surface of the battery cell; and
an inclined part extending in an inclined shape from an end portion of the second cam.

20. The battery cell manufacturing apparatus of claim 19, wherein
when the second cam bends the insulation tape, the insulation tape is guided along the inclined surface of the inclined part and firstly bent into a first angle which is the inclination angle of the inclined part, and thereafter, the insulation tape is then gradually bent into a second angle which forms an angle of zero degree with the upper surface of the cell.

21. The taping machine of claim 1, wherein:

the taping part is configured to apply only a portion of the insulation tape to the side surface; and the finish processing part is configured such that the portion of the insulation tape applied to the side portion is pressed onto the side surface, and remaining unattached portions of the insulation tape are attached to the upper surface of the battery cell by being bent onto the upper surface of the battery cell.

* * * * *